United States Patent [19]

Niespodziany et al.

[11] Patent Number: 5,186,521
[45] Date of Patent: Feb. 16, 1993

[54] WHEEL AND DRIVE KEY ASSEMBLY

[75] Inventors: David A. Niespodziany; David L. Olson, both of South Bend; Ronald W. Schebel; Julie A. Wentland, both of Granger, all of Ind.

[73] Assignee: Allied-Signal Inc., Morristown, N.J.

[21] Appl. No.: 764,663

[22] Filed: Sep. 24, 1991

[51] Int. Cl.⁵ ............................................. F16D 55/36
[52] U.S. Cl. .................................. 301/6.91; 188/71.5; 188/264 G
[58] Field of Search .............. 301/6 R, 6 A, 6 D, 6 S, 301/6 W, 6 E, 6 WB; 188/18 A, 71.5, 264 G

[56] References Cited

U.S. PATENT DOCUMENTS

| | | | |
|---|---|---|---|
| 2,020,667 | 11/1935 | Wahl | 188/18 |
| 2,875,855 | 3/1959 | Albright | 188/18 |
| 3,061,050 | 10/1962 | Van Horn | 188/72 |
| 3,345,109 | 10/1967 | Peterson et al. | 301/6 R |
| 3,478,850 | 11/1969 | Abu-Akeel | 188/218 |
| 3,754,624 | 8/1973 | Eldred | 188/71.5 |
| 3,836,201 | 9/1974 | Stimson et al. | 301/6 A |
| 3,887,041 | 6/1975 | Malone | 188/264 G X |
| 3,958,833 | 5/1976 | Stanton | 301/6 A |
| 4,084,857 | 4/1978 | Vander Veen | 301/6 A |
| 4,557,356 | 12/1985 | Petersen | 188/218 |
| 4,856,619 | 8/1989 | Petersen | 188/18 A |
| 4,863,001 | 9/1989 | Edmisten | 188/71.5 X |
| 4,944,370 | 7/1990 | Chambers et al. | 188/264 G X |
| 5,024,297 | 6/1991 | Russell | 188/18 A |

FOREIGN PATENT DOCUMENTS

| | | |
|---|---|---|
| 0067113 | 12/1982 | European Pat. Off. . |
| 0398092 | 11/1990 | European Pat. Off. . |
| 1148116 | 5/1963 | Fed. Rep. of Germany . |

Primary Examiner—Russell D. Stormer
Attorney, Agent, or Firm—Larry J. Palguta; Leo H. McCormick, Jr.; Robert A. Walsh

[57] ABSTRACT

The wheel and rotor drive key assembly (10) comprises a wheel (12) having a plurality of integral torque-transmitting drive lugs (22) which extend radially inwardly from an inner surface (20) of the wheel (12) and axially across the inner surface (20) from one end to the other of the lug (22). The lug (22) has a radially inner face (24) extending axially along the lug (22) and includes a radially outwardly extending contoured opening or recess (30) defining undercut portions (34) of the drive lug (22). A complementary-shaped retention member or nut (40) is disposed therein so that laterally extending side of retainer portions (42) of the retention nut (40) engage the undercut portions (34) of the drive lug (30) in order to retain radially the retention nut (40). The retention nut (40) includes a threaded portion (46) of an opening (44) which receives a retention screw (90) disposed within an opening (56) of a U-shaped rotor drive key or cap member (50). The rotor drive key (50) is disposed over the drive lug (22) such that radially extending side walls (54) of the drive key (50) trap circumferentially the retention nut (40) within the recess (30).

17 Claims, 1 Drawing Sheet

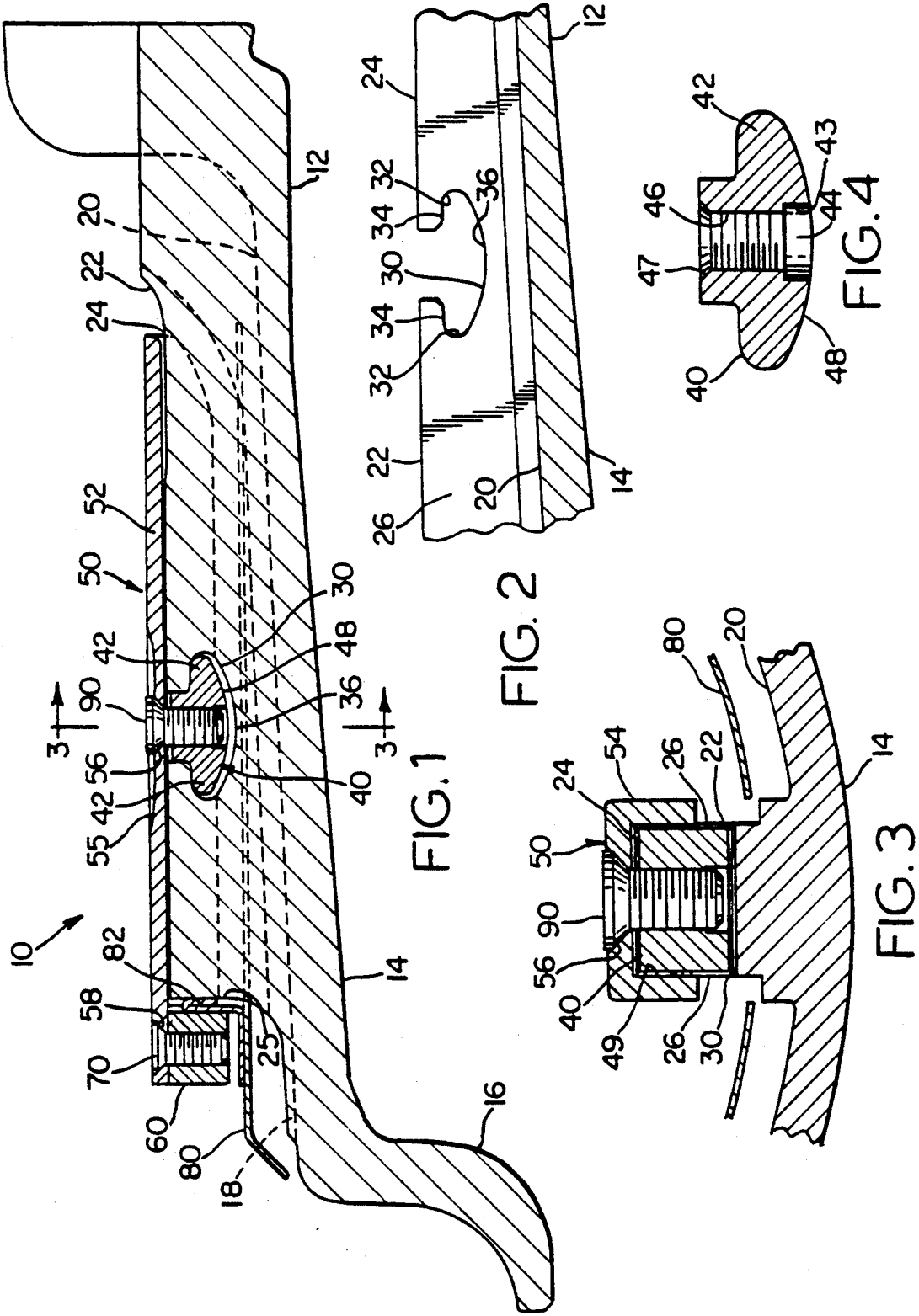

WHEEL AND DRIVE KEY ASSEMBLY

This invention relates generally to wheels having integral torque-transmitting drive lugs, and in particular to aircraft wheels having integral torque-transmitting drive lugs in combination with rotor drive keys.

Aircraft wheels have been combined previously with mechanisms for engaging rotors of an associated brake. One type of engagement mechanism comprises a separate drive key which is attached to the wheel, as illustrated in Russell U.S. Pat. No. 5,024,297. Another type of engagement mechanism comprises an integral torque-transmitting drive lug which extends axially across the inner surface of the wheel's interior opening and is covered by a rotor drive key which engages rotors of the brake mechanism, as disclosed in Rastogi et al. U.S. Pat. No. 4,018,482. Such rotor drive keys are typically attached to the integral drive lug by means of screws received within screw holes located in the integral drive lug. The screw holes within the integral drive lug of the wheel constitute stress risers in that stresses, during the operation of the wheel and brake, can concentrate at these tapped screw holes and cause cracks to appear in the drive lug and eventually result in serious damage to the wheel. It is highly desirable to eliminate such tapped screw holes in an integral drive lug in order to eliminate or minimize such stress concentrations, while retaining the rotor drive key in engagement with the integral drive lug. It is desirable that the tapped screw holes be eliminated because during wheel operation a slight deformation in the shape of the wheel known as wheel ovalization generates high stresses in the integral drive lug region, and such stresses can congregate at the tapped screw holes.

The present invention provides a solution to the above problem by providing a wheel and drive key assembly, comprising a wheel having a generally cylindrical interior opening with at least one axially extending drive lug disposed in said interior opening, the drive lug comprising a torque-transmitting lug integral with said wheel and extending radially inwardly from an inner surface of said interior opening, the lug having axially extending side faces for transmitting torque to said wheel and a radially inner face of said lug spaced radially inwardly from said inner surface of the wheel, the lug being recessed at a position along the axial length thereof wherein the recess includes an undercut portion, a retention member disposed within the recess and having a laterally extending portion received in the undercut portion in order to retain the retention member within the recess, a drive key disposed over the radially inner face and extending along said side faces, and means for connecting the retention member and drive key in order to couple said retention member with said drive key.

The invention is described in detail below with reference to the drawings which illustrate an embodiment in which:

FIG. 1 is a section view of an inboard section of an aircraft wheel with integral drive lug and a rotor drive key secured thereto;

FIG. 2 is a side view of the portion of the drive lug having an undercut recess therein;

FIG. 3 is a section view taken along view line 3—3 of FIG. 1; and

FIG. 4 is a section view of the retention member.

The wheel and rotor drive key assembly of the present invention is designated generally by reference numeral 10 in FIG. 1. Wheel 12 comprises an aircraft wheel having along rim 14 a radially outwardly extending end flange 16. Wheel 12 includes interior cylindrical opening 18 comprising an inner surface 20 having about the circumference thereof a plurality of radially and axially extending drive lugs 22. Drive lugs 22, of which one is illustrated in FIG. 1, each extend radially inwardly into interior opening 18 to provide a radially inner face 24 and radially extending side faces 26 (see FIG. 3) that provide a torque-transmitting lug integral with wheel 12. Disposed axially along the inner face 24 of drive lug 22 is radially outwardly extending contoured opening or recess 30 comprising axially extending undercut or curved portions 32 (see FIG. 2) which extend axially under side undercut portions 34 to provide an undercut lug. The undercut opening or recess 30 permits a complementary-shaped retention member or nut 40 having laterally extending curved side or retainer portions 42 to be moved circumferentially, relative to wheel opening 18, into contoured opening 30 so that retention member 40 is disposed within opening or recess 30 with lateral portions 42 located radially under lateral undercut portions 34 of the lug.

Retention nut 40 includes through opening 44 which includes counterbore 43, threaded or tapped hole portion 46 and countersunk portion 47 (see FIG. 4). Nut 40 has flat sides 49 (FIG. 3) which are located substantially parallel to side faces 26 when nut 40 is in recess 30. Rotor drive key or cap member 50 is generally U-shaped and comprises axially extending portion 52 overlying inner face 24, radially extending side walls 54 which extend at least partially over side faces 26, axially extending narrow recess 55 which communicates with screw opening 56, and an end screw hole 58. A retention screw 90 is received within screw hole 56 of rotor drive key or cap member 50 and threadedly received by threaded portion 46 of retention nut 40. When retention screw 90 is tightened, retention member or nut 40 is drawn radially inwardly in FIG. 1 so that retention nut 40 is coupled tightly with the undercut portions 34 whereby lateral or retainer portions 42 of retention nut 40 engage lateral undercut portions 34 of the lug in order to effect a preload therebetween, as shown in FIG. 1.

The wheel and rotor drive key assembly illustrated in the figures is assembled according to the following steps. Retention nut 40 is slid circumferentially into contoured opening or recess 30 so that it is trapped radially within the recess. Rotor drive key or cap member 50 is then slid axially onto drive lug 22, whereby sidewalls 54 trap circumferentially retention nut 40 within recess 30. Retention screw 90 is then inserted through rotor drive key opening 56 and threaded into threaded portion 46 of retention nut 40. When screw 90 is tightened, retention nut 40 is coupled with the rotor drive key to be positioned as shown in FIG. 1 wherein curved bottom portion 4B is spaced slightly apart from bottom 36 of recess 30. Curved or retainer portions 42 of retention nut 40 engage undercut portions 34 of lug 22.

Attached via screw 70 received within end screw hole 58 is spacer 60 which engages radially extending tab 82 of segmented heat shield 80 in order to position axially heat shield 80 within interior opening 18 between adjacent lugs 22. Tab 82 is trapped axially between a side wall of spacer 60 and the radially extending axial end wall 25 of drive lug 22. Spacer 60 and screw 70 may be preassembled to the rotor drive key, or attached at a later time when segmented heat shield 80 is assembled within the wheel.

Integral torque-transmitting drive lug 22 provides the contoured opening or recess 30 which captures radially retention nut 40 during assembly and wheel operation, while providing a contoured opening or recess which reduces stresses typically found in the previous tapped hole drive lug constructions.

During operation of the wheel, the rotor drive key engages rotors of an associated aircraft brake and during braking the wheel may experience wheel ovalization. Wheel ovalization generates high stresses in the drive lug region, and the present invention minimizes stress concentrations within the integral drive lug as a result of the elimination of the previously utilized tapped screw holes for attaching a rotor drive key. Retention nut 40 may comprise numerous geometric shapes which match corresponding geometric configurations for the contoured opening or recess 30 located within the integral drive lug. The retention nut is held in place during assembly by a combination of the corresponding geometry of the drive lug recess 30 and sidewalls 54 of drive key 50. The shape of the retention nut and complementary-shaped contoured recess compensates for and limits any tolerance build-up, and the retention nut provides an easily replaceable item during service overhaul. The rotor drive key or cap member provides an effective transfer of braking load from the brake to the wheel without damage to the wheel. It is easily slid onto rotor drive lug 22 such that key opening 56 is easily aligned with threaded portion 46 of opening 44 of retention nut 40. Retention screw 90 can be a standard externally threaded screw, and held in place by staking with the rotor drive key or the utilization of an adhesive. The present invention provides an inexpensive easily replaceable retention nut should threaded portion 46 of the nut 40 be damaged during installation or removal of the rotor drive key.

The present invention contributes to the further effective utilization of aircraft wheels having integral drive lugs. Wheels with integral drive lugs contribute to the overall stiffness of a wheel, while permitting the use of steel rotor drive keys which contributes to a savings in weight. Such a wheel permits braking torque to be transmitted directly to the wheel, while the rotor drive keys retard heat flow into the wheel and protect the integral bosses from "nicking" often experienced in service usage. The rotor drive key may be chrome plated which will further reduce friction and wear of the surfaces thereof, and distribute brake torque and wear more evenly.

We claim:

1. A wheel and drive key assembly, comprising a wheel having a generally cylindrical interior opening with at least one axially extending drive lug disposed in said interior opening, the drive lug comprising a torque-transmitting lug integral with said wheel and extending radially inwardly from an inner surface of said interior opening, the lug having axially extending side faces for transmitting torque to said wheel and a radially inner face of said lug spaced radially inwardly from said inner surface of the wheel, the lug being recessed at a position along the axial length thereof wherein the recess includes an undercut portion, a retention member disposed within the recess and having a laterally extending portion received in the undercut portion in order to retain the retention member within the recess, a drive key disposed over the radially inner face and extending along said side faces, and means for connecting the retention member and drive key in order to couple said retention member with said drive key.

2. The wheel and drive key assembly in accordance with claim 1, wherein said drive key is generally U-shaped with radially extending side walls thereof extending over respective portions of each of the side faces of the lug in order to capture circumferentially the retention member within the recess.

3. The wheel and drive key assembly in accordance with claim 1, wherein the retention member and recess comprise respectively a pair of laterally extending portions and undercut portions, each extending portion received within a respective undercut portion of said recess.

4. The wheel and drive key assembly in accordance with claim 3, wherein the connecting means comprises a threaded hole and a screw.

5. The wheel and drive key assembly in accordance with claim 1, wherein the retention member is disposed at a slight separation from a bottom of the recess as a result of the coupling of the retention member with the drive key.

6. The wheel and drive key assembly in accordance with claim 1, wherein said drive key is generally U-shaped with radially extending side walls thereof extending over respective portions of each of the side faces of the lug in order to capture circumferentially the retention member within the recess.

7. The wheel and drive key assembly in accordance with claim 1, wherein the retention member includes oppositely disposed flat sides aligned substantially parallel with said side faces.

8. The wheel and drive key assembly in accordance with claim 1, wherein the drive key includes an axial recessed portion communicating with a through opening therein of said connecting means.

9. The wheel and drive key assembly in accordance with claim 1, further comprising a spacer member attached to an end of said drive key, and heat shield means disposed within said interior opening and having a radially extending portion trapped axially between said spacer member and a radially extending axial end wall of said drive lug.

10. A wheel and cap member assembly, comprising a wheel having a generally cylindrical interior opening with at least one axially extending drive lug disposed in said interior opening, the drive lug comprising a torque-transmitting lug integral with said wheel and extending radially inwardly from an inner surface of said interior opening, the lug having axially extending side faces for transmitting torque to said wheel and a radially inner face of said lug spaced radially inwardly from said inner surface of the wheel, the lug having a contoured opening at a position along the axial length thereof wherein the contoured opening includes a radial retention portion of the lug, a retention member disposed within the contoured opening and having a retainer portion engaging the radial retention portion of the lug in order to retain radially the retention member within the contoured opening, a cap member disposed over the radially inner face and extending along said side faces, and means for connecting the retention member and cap member in order to couple said retention member with said cap member, wherein said cap member is generally U-shaped with radially extending side walls thereof extending over respective portions of each of the side faces of the lug in order to capture circumferentially the retention member within the contoured opening.

11. A wheel and cap member assembly, comprising a wheel having a generally cylindrical interior opening with at least one axially extending drive lug disposed in said interior opening, the drive lug comprising a torque-transmitting lug integral with said wheel and extending radially inwardly from an inner surface of said interior opening, the lug having axially extending side faces for transmitting torque to said wheel and a radially inner face of said lug spaced radially inwardly from said inner surface of the wheel, the lug having a contoured opening at a position along the axial length thereof wherein the contoured opening includes a radial retention portion of the drive lug, a retention member disposed within the contoured opening and having a retainer portion engaging the radial retention portion in order to retain radially the retention member within the contoured opening, the retention member including a pair of laterally extending portions and the radial retention portion, having lateral portions associated therewith, each laterally extending portion received under one of the lateral portions of the radial retention portion of said drive lug, a cap member disposed over the radially inner face and extending along said side faces, and means for connecting the retention member and cap member in order to couple said retention member with said cap member.

12. The wheel and cap member assembly in accordance with claim 11, wherein the connecting means comprises a threaded hole and a screw.

13. The wheel and cap member assembly in accordance with claim 11, wherein the retention member is disposed at a slight distance above a bottom of the contoured opening as a result of the coupling of the retention member with the cap member.

14. The wheel and cap member assembly in accordance with claim 11, wherein the retention member includes oppositely disposed flat sides aligned substantially parallel with said side faces.

15. A wheel and cap member assembly, comprising a wheel having a generally cylindrical interior opening with at least one axially extending drive lug disposed in said interior opening, the drive lug comprising a torque-transmitting lug integral with said wheel and extending radially inwardly from an inner surface of said interior opening, the lug having axially extending side faces for transmitting torque to said wheel and a radially inner face of said lug spaced radially inwardly from said inner surface of the wheel, the lug having a contoured opening at a position along the axial length thereof wherein the contoured opening includes a radial retention portion of the drive lug, a retention member disposed within the contoured opening and having a retainer portion engaging the radial retention portion in order to retain radially the retention member within the contoured opening and prevent the retention member from moving radially inwardly relative to said interior opening, a cap member disposed over the radially inner face and extending along said side faces, and means for connecting the retention member and cap member in order to couple said retention member with said cap member.

16. The wheel and cap member assembly in accordance with claim 15, wherein the cap member comprises a drive key which includes an axial recessed portion communicating with a through opening therein of said connecting means.

17. The wheel and cap member assembly in accordance with claim 15, further comprising a spacer member attached to an end of said drive key, and heat shield means disposed within said interior opening and having a radially extending portion trapped axially between said spacer member and a radially extending axial end wall of said drive lug.

* * * * *